(12) United States Patent
Suzuki et al.

(10) Patent No.: US 9,275,797 B2
(45) Date of Patent: Mar. 1, 2016

(54) MULTILAYER CERAMIC CAPACITOR, DIELECTRIC CERAMIC, MULTILAYER CERAMIC ELECTRONIC COMPONENT, AND METHOD FOR MANUFACTURING MULTILAYER CERAMIC CAPACITOR

(71) Applicant: MURATA MANUFACTURING CO., LTD., Nagaokakyo-Shi (JP)

(72) Inventors: Shoichiro Suzuki, Nagaokakyo (JP); Koichi Banno, Nagaokakyo (JP); Akihiro Shiota, Nagaokakyo (JP); Masahiro Otsuka, Nagaokakyo (JP); Taisuke Kanzaki, Nagaokakyo (JP); Masanori Nakamura, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 126 days.

(21) Appl. No.: 14/011,499

(22) Filed: Aug. 27, 2013

(65) Prior Publication Data

US 2013/0342958 A1     Dec. 26, 2013

Related U.S. Application Data

(63) Continuation of application No. PCT/JP2012/056688, filed on Mar. 15, 2012.

(30) Foreign Application Priority Data

Mar. 18, 2011  (JP) .................................. 2011-060842

(51) Int. Cl.
*H01G 4/12*     (2006.01)
*H01B 3/12*     (2006.01)
(Continued)

(52) U.S. Cl.
CPC .............. *H01G 4/1227* (2013.01); *B82Y 30/00* (2013.01); *C04B 35/4682* (2013.01);
(Continued)

(58) Field of Classification Search
CPC .......... H01G 4/12; H01G 4/1218; H01G 4/30

USPC ......................... 361/321.1, 321.2, 321.4, 311
See application file for complete search history.

(56) References Cited

U.S. PATENT DOCUMENTS 5,117,326 A     5/1992  Sano et al.
2009/0135542 A1  5/2009  Choo et al.
(Continued)

FOREIGN PATENT DOCUMENTS

JP     H02-266229 A     10/1990
JP     H08-69939 A      3/1996
(Continued)

OTHER PUBLICATIONS

PCT/JP2012/056688, International Search Report, dated Jun. 19, 2012.

(Continued)

*Primary Examiner* — Dion R Ferguson
(74) *Attorney, Agent, or Firm* — Arent Fox LLP

(57) ABSTRACT

A dielectric ceramic that can be sintered at a sufficiently low temperature and has a desired specific resistance at a high temperature, and a multilayer ceramic electronic component (a multilayer ceramic capacitor and the like) using the dielectric ceramic are provided. The multilayer ceramic capacitor includes a multilayer body having a plurality of laminated dielectric ceramic layers, and a plurality of internal electrodes at interfaces between the dielectric ceramic layers; and external electrodes 8 and 9 on outer surfaces of the multilayer body. The composition of the multilayer body includes a perovskite-type compound containing Ba and Ti (where a part of Ba may be substituted by Ca, and a part of Ti may be substituted by Zr) as a primary ingredient, and further includes M (where M is at least one of Cu, Zn, Li, K, and Na) and Bi. The total content of M and Bi is equal to or greater than 3 molar parts when the total content of Ti and Zr is 100 molar parts. The crystal particle size of the dielectric ceramic is 30 nm or more and 150 nm or less.

20 Claims, 1 Drawing Sheet

(51) Int. Cl.
*C04B 35/468* (2006.01)
*C04B 35/626* (2006.01)
*C04B 35/638* (2006.01)
*H01G 4/30* (2006.01)
*B82Y 30/00* (2011.01)

(52) U.S. Cl.
CPC .... *C04B 35/62675* (2013.01); *C04B 35/62685* (2013.01); *C04B 35/638* (2013.01); *H01B 3/12* (2013.01); *H01G 4/1236* (2013.01); *H01G 4/30* (2013.01); *C04B 2235/3201* (2013.01); *C04B 2235/3203* (2013.01); *C04B 2235/3208* (2013.01); *C04B 2235/3213* (2013.01); *C04B 2235/3215* (2013.01); *C04B 2235/3232* (2013.01); *C04B 2235/3244* (2013.01); *C04B 2235/3281* (2013.01); *C04B 2235/3284* (2013.01); *C04B 2235/3298* (2013.01); *C04B 2235/44* (2013.01); *C04B 2235/5454* (2013.01); *C04B 2235/781* (2013.01); *C04B 2235/785* (2013.01)

(56) References Cited

U.S. PATENT DOCUMENTS

| | | | |
|---|---|---|---|
| 2009/0141427 | A1 | 6/2009 | Lyoo et al. |
| 2012/0270720 | A1 | 10/2012 | Tanabe |
| 2013/0258547 | A1* | 10/2013 | Mizuno ............... 361/301.4 |

FOREIGN PATENT DOCUMENTS

| | | | |
|---|---|---|---|
| JP | 2002-173368 A | 6/2002 |
| JP | 2007-290940 A | 11/2007 |
| JP | 2009-120477 A | 6/2009 |
| JP | 2009-132606 A | 6/2009 |
| JP | 2010-001180 A | 1/2010 |
| KR | 20090056039 A | 6/2009 |
| WO | WO 2011/046205 A1 | 4/2011 |

OTHER PUBLICATIONS

PCT Written Opinion of the International Searching Authority, date of mailing Jun. 19, 2012.
Japanese Office Action issued for corresponding application JP 2014-128102, dated May 26, 2015 (English translation is attached).

* cited by examiner

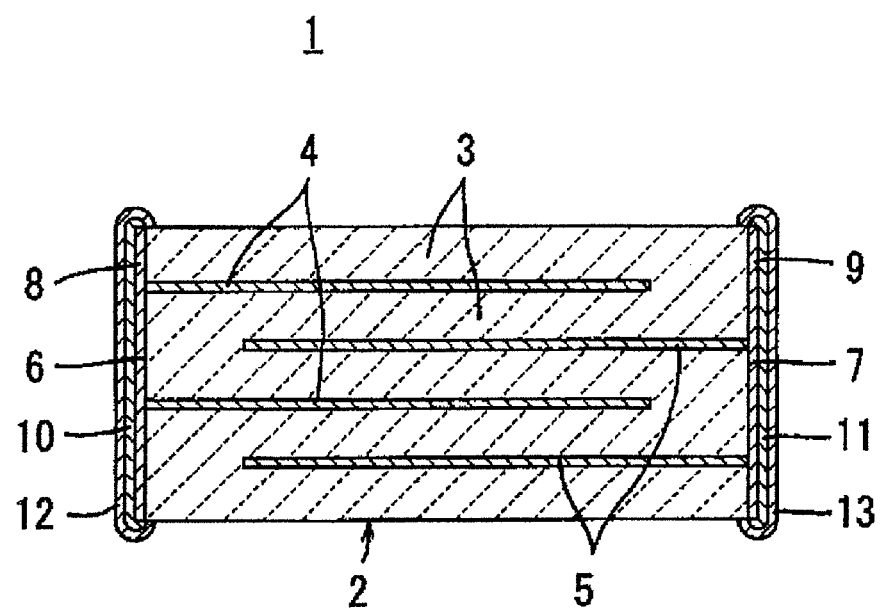

MULTILAYER CERAMIC CAPACITOR, DIELECTRIC CERAMIC, MULTILAYER CERAMIC ELECTRONIC COMPONENT, AND METHOD FOR MANUFACTURING MULTILAYER CERAMIC CAPACITOR

This is a continuation of application Ser. No. PCT/JP2012/056688, filed Mar. 15, 2012, the entire contents of which are incorporated herein by reference.

TECHNICAL FIELD

The present invention relates to a multilayer ceramic capacitor, and also relates to a dielectric ceramic used for the multilayer ceramic capacitor, a multilayer ceramic electronic component represented by the multilayer ceramic capacitor, and a method for manufacturing the multilayer ceramic capacitor.

BACKGROUND ART

With reference to FIG. 1, a multilayer ceramic capacitor 1 that is a representative example of a multilayer ceramic electronic component according to the present invention will be described first.

Multilayer ceramic capacitor 1 includes a multilayer body 2 which is formed of a plurality of laminated ceramic layers 3 and a plurality of internal electrodes 4 and 5 each formed along an interface between ceramic layers 3.

A first external electrode 8 and a second external electrode 9 are formed at mutually different positions on an outer surface of multilayer body 2. In the multilayer ceramic capacitor 1 illustrated in FIG. 1, first external electrode 8 and second external electrode 9 are formed respectively on opposing end surfaces 6 and 7 of multilayer body 2. Internal electrode 4 includes a plurality of first internal electrodes 4 which are electrically connected to first external electrode 8, and internal electrode 5 includes a plurality of second internal electrodes 5 which are electrically connected to second external electrode 9. First internal electrodes 4 and second internal electrodes 5 are disposed alternately in the lamination direction. If necessary, a surface of external electrode 8 is coated with a first plating layer 10 and a second plating layer 12, while a surface of external electrode 9 is coated with a first plating layer 11 and a second plating layer 13.

Since size reduction is particularly required for the multilayer ceramic capacitor, the process of manufacturing the multilayer ceramic capacitor includes a method of laminating a green sheet made of a dielectric ceramic and an internal electrode layer and then sintering the laminated sheet and layer at the same time. For cost reduction, base metals such as Ni are used for an internal electrode of the multilayer ceramic capacitor.

In recent years, as thinning of the ceramic layer has further progressed, thinning of the internal electrode is also urgently required. However, thinning of the internal electrode causes a problem that the rate of coverage of the internal electrode tends to be decreased due to spherically-agglomerated metal particles. This requires sintering at a lower temperature.

Furthermore, since a multilayer ceramic electronic component is required to have various characteristics, it also becomes necessary to use various types of metals such as Ag and Cu as a metal for an internal electrode. This also requires sintering at a low temperature.

For the reasons as described above, a ceramic material that can be sintered at a low temperature and exhibits excellent dielectric properties is demanded.

For example, PTD 1 discloses a barium titanate-based dielectric ceramic composition suitable for a multilayer substrate or a multilayer ceramic capacitor, and also discloses that the dielectric ceramic composition can be sintered at 1000° C. or lower.

CITATION LIST

Patent Document

PTD 1: Japanese Patent Laying-Open No. 2007-290940

SUMMARY OF INVENTION

Technical Problem

In the dielectric ceramic composition in PTD 1, however, there is a problem that the specific resistance at a high temperature (150° C.) is relatively low.

Thus, an object of the present invention is to provide a dielectric ceramic that can be sintered at a sufficiently low temperature and has a high specific resistance at a high temperature, and also to provide a multilayer ceramic electronic component (a multilayer ceramic capacitor, a multilayer ceramic substrate, and the like) made using the dielectric ceramic.

Solution to Problem

As the solution to the problems noted, a multilayer ceramic capacitor of the present invention includes a multilayer body having a plurality of laminated dielectric ceramic layers and a plurality of internal electrodes formed along interfaces between the dielectric ceramic layers; and an external electrode formed on an outer surface of the multilayer body. The composition of the multilayer body includes a perovskite-type compound containing Ba and Ti (where a part of Ba may be substituted by Ca, and a part of Ti may be substituted by Zr) as a primary ingredient, and further includes M (where M is at least one of Cu, Zn, Li, K, and Na) and Bi. A total content of M and Bi is equal to or greater than 3 molar parts when a total content of Ti and Zr is 100 molar parts. The size of each of the dielectric ceramic is 30 nm or more and 150 nm or less.

In this case, it is preferable that the composition of the multilayer body satisfies the condition that the total content of M and Bi is equal to or less than 12 molar parts when the total content of Ti and Zr is 100 molar parts.

Furthermore, a multilayer ceramic capacitor of the present invention includes a multilayer body having a plurality of laminated dielectric ceramic layers and a plurality of internal electrodes formed along interfaces between the dielectric ceramic layers; and an external electrode formed on an outer surface of the multilayer body. The composition of the dielectric includes a perovskite-type compound containing Ba and Ti (where a part of Ba may be substituted by Ca, and a part of Ti may be substituted by Zr) as a primary ingredient, and further includes Q (where Q is at least one of Ba, Ca and Sr) and Bi. The total content of Ba, Ca, Sr, and Bi is equal to or greater than 3 molar parts when the total content of Ti and Zr is 100 molar parts. The crystal particle size of the dielectric ceramic is 30 nm or more and 150 nm or less.

In this case, it is preferable that the composition of the multilayer body satisfies a condition that the total content of Ba, Ca, Sr, and Bi is equal to or less than 12 molar parts when the total content of Ti and Zr is 100 molar parts.

Furthermore, a multilayer ceramic capacitor of the present invention includes a multilayer body having a plurality of laminated dielectric ceramic layers and a plurality of internal electrodes formed along interfaces between the dielectric ceramic layers; and an external electrode formed on an outer surface of the multilayer body. the composition of the dielectric includes a perovskite-type compound containing Ba and Ti (where a part of Ba may be substituted by Ca, and a part of Ti may be substituted by Zr) as a primary ingredient, and further includes M (where M is at least one of Cu, Zn, Li, K, and Na) and Bi. The crystal particle size of the dielectric ceramic is 30 nm or more and 150 nm or less. The total content of M and Bi is equal to or greater than 3 molar parts when the total content of Ti and Zr at a time when the multilayer body is dissolved in a solvent is 100 molar parts.

In this case, it is preferable that the total content of M and Bi is equal to or less than 12 molar parts when the total content of Ti and Zr at a time when the multilayer body is dissolved in the solvent is 100 molar parts.

Furthermore, a dielectric ceramic of the present invention includes a perovskite-type compound containing Ba and Ti (where a part of Ba may be substituted by Ca, and a part of Ti may be substituted by Zr) as a primary ingredient, and further includes M (where M is at least one of Cu, Zn, Li, K, and Na) and Bi. The total content of M and Bi is equal to or greater than 3 molar parts when the total content of Ti and Zr is 100 molar parts. The crystal particle size of the dielectric ceramic is 30 nm or more and 150 nm or less.

In this case, it is preferable that the total content of M and Bi is equal to or less than 12 molar parts when the total content of Ti and Zr is 100 molar parts.

Furthermore, a dielectric ceramic according to the present invention includes a perovskite-type compound containing Ba and Ti (where a part of Ti may be substituted by Zr) as a primary ingredient, and further includes Q (where Q is at least one of Ba, Ca and Sr) and Bi. The total content of Ba, Ca, Sr, and Bi is equal to or greater than 3 molar parts when the total content of Ti and Zr is 100 molar parts. The crystal particle size of the dielectric ceramic is 30 nm or more and 150 nm or less.

In this case, it is preferable that the total content of Ba, Ca, Sr, and Bi is equal to or less than 12 molar parts when the total content of Ti and Zr is 100 molar parts.

The dielectric ceramic of the present invention described above can be used for a dielectric ceramic layer of a multilayer ceramic electronic component including a multilayer body having a plurality of laminated dielectric ceramic layers and a plurality of internal electrodes formed along interfaces between the ceramic layers; and external electrodes formed on an outer surface of the multilayer body.

Furthermore, a method for manufacturing a multilayer ceramic capacitor of the present invention includes the steps of: preparing primary ingredient powder including a perovskite-type compound containing Ba and Ti (where a part of Ba may be substituted by Ca, and a part of Ti may be substituted by Zr) as a primary ingredient; preparing at least one compound of M and Q (where M is at least one of Cu, Zn, Li, K, and Na, and Q is at least one of Ba, Ca and Sr), and a Bi compound; blending the primary ingredient powder, the at least one compound of M and Q, and the Bi compound, and obtaining a ceramic slurry; obtaining a ceramic green sheet from the ceramic slurry; laminating the ceramic green sheets and internal electrode layers to obtain a non-sintered multilayer body; and sintering the non-sintered multilayer body to obtain a multilayer body having an internal electrodes formed between dielectric ceramic layers. The total content of M, Q and Bi is equal to or greater than 3 molar parts when the total content of Ti and Zr is 100 molar parts. The crystal particle size of each of the dielectric ceramic layers is 30 nm or more and 150 nm or less.

In this case, it is preferable that the total content of M, Q and Bi is equal to or less than 12 molar parts when the total content of Ti and Zr is 100 molar parts.

Advantageous Effects of Invention

According to the present invention, it becomes possible to provide a dielectric ceramic that can be sintered at a sufficiently low temperature and has a high specific resistance at a high temperature, and thereby significantly contribute to size reduction and enhanced performance of a multilayer ceramic electronic component (a multilayer ceramic capacitor, a multilayer ceramic substrate, and the like).

BRIEF DESCRIPTION OF DRAWINGS

FIG. 1 is a schematic diagram showing an example of a multilayer ceramic capacitor representative of a multilayer ceramic electronic component of the present invention.

DESCRIPTION OF EMBODIMENTS

The dielectric ceramic of the present invention includes a perovskite-type compound containing Ba and Ti (where a part of Ba may be substituted by Ca, and a part of Ti may be substituted by Zr) as a primary ingredient, and further includes M (where M is at least one of Cu, Zn, Li, K, and Na) and Bi. Also, the total content of M and Bi relative to 100 molar parts of the total content of Ti and Zr is equal to or greater than 3 molar parts, and the crystal particle size of the dielectric ceramic is 30 nm or more and 150 nm or less, so that both of sintering at a low temperature and an increased specific resistance at a high temperature can be achieved.

In this case, although the upper limit value of the total content of M and Bi relative to 100 molar parts of the total content of Ti and Zr is not particularly defined, the effect of the present invention becomes remarkable particularly at 12 molar parts or lower.

Furthermore, another dielectric ceramic of the present invention includes a perovskite-type compound containing Ba and Ti (where a part of Ba may be substituted by Ca, and a part of Ti may be substituted by Zr) as a primary ingredient, and also includes Q (where Q is at least one of Ba, Ca and Sr) and Bi. Also, the total content of Ba, Ca, Sr, and Bi is equal to or greater than 3 molar parts when the total content of Ti and Zr is 100 molar parts, and the crystal particle size of the dielectric ceramic is 30 nm or more and 150 nm or less, so that both of sintering at a low temperature and an increased specific resistance at a high temperature can be achieved.

In this case, although the upper limit value of the total content of Ba, Ca, Sr, and Bi at the time when the total content of Ti and Zr is 100 molar parts is not particularly defined, the effect of the present invention becomes remarkable particularly at 12 molar parts or lower.

In addition, while the molar ratio of a Ba site (Ba, Ca, Sr) and a Ti site (Ti, Zr) in the primary ingredient is basically close to 1, this molar ratio can be controlled to fall within a range of 0.97 or more and 1.05 or less as long as it does not affect the object of the present invention.

Furthermore, as long as it does not affect the object of the present invention, the dielectric ceramic of the present invention may contain a rare earth element, Mg, Mn, V, Al, Ni, Co, Zn or the like.

Hereinafter, an example of a method for manufacturing the dielectric ceramic of the present invention will be described.

First, a hydrothermal synthesis method is used to prepare particulate powder of barium titanate, which is then calcined to obtain primary ingredient powder. Although the hydrothermal synthesis method is suitable for obtaining the particulate raw material powder, a solid-phase synthesis method may also be used.

Then, powders of CuO, ZnO, $BaCO_3$, $SrCO_3$, $CaCO_3$, $Li_2CO_3$, $Na_2CO_3$, $K_2CO_3$, and $Bi_2O_3$ are added into the primary ingredient powder at a predetermined amount.

As long as it does not affect the object of the present invention, the powders need not be limited to oxide powder or carbonate powder. The powders are blended in a solution and dried, thereby obtaining ceramic raw material powder as a final raw material.

The subsequent processes will be described by taking, as an example, a multilayer ceramic capacitor representing a multilayer ceramic electronic component of the present invention.

The above-mentioned ceramic raw material powder is prepared. The ceramic raw material powder is blended, where necessary, with an organic binder component in a solvent to provide a ceramic slurry. Then, the ceramic slurry is formed into a sheet, thereby obtaining a ceramic green sheet.

Next, a conductor film serving as an internal electrode is formed on the ceramic green sheet, which formation can be conducted according to several methods. Among them, one simple method is to screen-print a paste containing metal particles such as Ag and Ni and an organic vehicle into a desired pattern. Alternatively, there is also a method of forming a conductor film according to a metal foil transfer-printing method, or forming a conductor film while masking it by the vacuum thin-film deposition method such as the sputtering method.

In this way, ceramic green sheets and internal electrode layers are laminated to form multiple layers, and then pressure-bonded, thereby obtaining a raw multilayer body before sintering.

This raw multilayer body is held, for example, for 6 hours at a temperature of 280° C. under an air atmosphere, thereby burning off the binder. Then, in a sintering furnace, the multilayer body is sintered at a predetermined temperature under a predetermined atmosphere, for example, at a temperature rising/falling rate of 20° C./minutes at a maximum temperature of 700 to 900° C. under an air atmosphere, to obtain a ceramic multilayer body including a sintered ceramic body.

A multilayer ceramic capacitor is obtained by forming external electrodes at locations where the internal electrode are drawn out of the ceramic multilayer body.

Examples of a method of forming the external electrode may include a method of applying a paste containing glass frit and metal particles of Cu, Ag and the like on the ceramic multilayer body and baking it thereafter, a method of applying a resin electrode containing a thermosetting resin and an epoxy resin and curing it thereafter, and the like. If necessary, a plating layer of Ni, Sn or the like is further formed on the surface of the external electrode.

The multilayer ceramic electronic component of the present invention is applicable not only to a multilayer ceramic capacitor but also to various electronic components such as a multilayer ceramic substrate and the like.

Experimental Example

First, a particulate powder of barium titanate was produced using the hydrothermal synthesis method, and then calcined to obtain primary ingredient powder having a prescribed average particle size.

Specifically, powders of $Ba(OH)_2$, $Ca(OH)_2$, $Sr(OH)_2$, $TiO_2$, and $ZrO_2$ were first prepared as materials constituting a primary ingredient.

Then, amounts of the $TiO_2$ and $ZrO_2$ were weighed such that content of each of Ti and Zr relative to 1 molar part of the total content of Ti and Zr was equal to the molar part shown in each of Tables 1 and 2, and stirred in the water as a medium. Then, $Ba(OH)_2$, $Ca(OH)_2$ and $Sr(OH)_2$ were weighed such that each content of Ba, Ca and Sr relative to 1 molar part of the total content of Ti and Zr is equal to the molar part shown in each of Tables 1 and 2, and then introduced.

The temperature was raised to 200° C. while applying pressure so as not to evaporate the aqueous medium in which materials constituting the primary ingredient were distributed. Thereby, a reaction is caused to proceed. Consequently, a powder with an average particle size of about 20 nm was obtained in the aqueous medium.

Then, the obtained powder was dried and calcined, thereby obtaining ceramic powder that was primary ingredient powder. In this case, the pre-sintering temperature was changed in the range from 900 to 1100° C., to change the average particle size of the primary ingredient powder.

As a sub-ingredient, powders of CuO, ZnO, $BaCO_3$, $SrCO_3$, $CaCO_3$, $Li_2CO_3$, $Na_2CO_3$, $K_2CO_3$, and $Bi_2O_3$ were weighed such that content of each of Bi, Cu, Zn, Ba, Sr, Ca, Li, Na, and K relative to 100 molar parts of the total content of Ti and Zr in the above-described primary ingredient was equal to the molar part shown in each of Tables 1 and 2. The weighed powders were then blended into the primary ingredient powder to obtain a powder mixture.

The obtained powder mixture was confirmed to have the composition almost identical to those shown in Tables 1 and 2 through ICP emission spectrochemical analysis.

Subsequently, a polyvinyl butyral-based organic binder was added and blended into the above-described powder mixture, to which an organic solvent containing toluene was added, and the mixture was wet-blended using a ball mill for 24 hours to provide a ceramic slurry.

The ceramic slurry was formed into a sheet to obtain a ceramic green sheet having a thickness of 10 μm.

Then, a plurality of these ceramic green sheets were laminated, and pressure-bonded to obtain a raw multilayer body having a size of 4 mm×4 mm×0.5 mm.

This raw multilayer body was heated at 280° C. under an air atmosphere to remove an organic binder. Then, the multilayer body was sintered at 800° C. under an air atmosphere. When the resultant sintered multilayer body (sintered body) was dissolved in a solvent and subjected to ICP emission spectrochemical analysis, this multilayer body was confirmed to have a composition almost identical to those shown in Tables 1 and 2.

A resin electrode containing Ag and an epoxy resin was applied to both main surfaces of the obtained sintered body and cured at 180° C., thereby producing a specimen for evaluation.

The capacitance of the obtained specimen was measured using an automatic bridge-type meter under the condition of 25° C., 1 kHz and 1.0 Vrms, to calculate the dielectric constant from the dimensions of the sintered body. Ten specimens were subjected to measurement to calculate an average value.

Then, the resistance after applying a voltage of 500V for 60 seconds at 150° C. was measured, and the specific resistance was calculated from the dimensions of the sintered body. Ten specimens were subjected to measurement to calculate an average value.

The fracture surface of each specimen was observed with a scanning electron microscope (SEM). Then, through image analysis, the particle size of the crystal particle was measured based on the equivalent circle diameter of the crystal particle as a particle size. The particle sizes of 100 crystal particles for each specimen were measured and the average value was calculated as a crystal particle size.

Tables 1 and 2 each show the average crystal particle size, dielectric constant and specific resistance results in each specimen. Note that the content of each element relative to 100 molar parts of the primary ingredient is shown in the column of the sub-ingredient.

According to the results in Tables 1 and 2, a specific resistance log p at 150° C. was as high as 7 or higher while the dielectric constant was also 100 or higher in the case of a specimen of a dielectric ceramic including a perovskite-type compound containing Ba and Ti (where a part of Ba may be substituted by Ca, and a part of Ti may be substituted by Zr) as a primary ingredient, and further including M (where M is at least one of Cu, Zn, Li, K, and Na) and Bi, in which the crystal particle size of the ceramic is 30 nm or more and 150 nm or less, and the total content of M and Bi relative to 100 molar parts of the total content of Ti and Zr is equal to or greater than 3 molar parts. Also, specific resistance log p at 150° C. was as high as 7 or higher while the dielectric constant

TABLE 1

| Specimen No. | Primary Ingredient (Molar Part) | | | | | Sub-Ingredient (Molar Part) | | | | | | | | | Total Content | Crystal Particle Size | Dielectric Constant | Specific Resistance log p |
|---|---|---|---|---|---|---|---|---|---|---|---|---|---|---|---|---|---|---|
| | Ba | Ca | Sr | Ti | Zr | Bi | Cu | Zn | Li | Na | K | Ba | Sr | Ca | | | | |
| 1 | 1 | | | 1 | | 7 | 3 | | | | | | | | 10 | 30 | 120 | 7.6 |
| 2 | 1 | | | 1 | | 7 | 3 | | | | | | | | 10 | 50 | 300 | 7.4 |
| 3 | 1 | | | 1 | | 7 | 3 | | | | | | | | 10 | 100 | 720 | 7.5 |
| 4 | 1 | | | 1 | | 7 | 3 | | | | | | | | 10 | 150 | 1100 | 7.3 |
| 5 | 1 | | | 1 | | 7 | 3 | | | | | | | | 10 | 200 | 1300 | 5.8 |
| 6 | 1 | | | 1 | | 7 | 3 | | | | | | | | 10 | 400 | 1600 | 5.8 |
| 7 | 1 | | | 1 | | 7 | 3 | | | | | | | | 10 | 1000 | 2200 | 5.4 |
| 8 | 1 | | | 1 | | 9 | 1 | | | | | | | | 10 | 150 | 1060 | 8.9 |
| 9 | 1 | | | 1 | | 9 | 1 | | | | | | | | 10 | 200 | 1220 | 6.6 |
| 10 | 1 | | | 1 | | 5 | 5 | | | | | | | | 10 | 150 | 1100 | 7.0 |
| 11 | 1 | | | 1 | | 5 | 5 | | | | | | | | 10 | 200 | 1300 | 5.2 |
| 12 | 0.95 | 0.05 | | 1 | | 7 | 3 | | | | | | | | 10 | 130 | 980 | 7.9 |
| 13 | 0.98 | | 0.02 | 1 | | 7 | 3 | | | | | | | | 10 | 130 | 1040 | 7.8 |
| 14 | 1 | | | 0.9 | 0.1 | 7 | 3 | | | | | | | | 10 | 130 | 1010 | 8.2 |
| 15 | 1 | | | 1 | | 6 | | 3 | | | | | | | 9 | 140 | 990 | 7.6 |
| 16 | 1 | | | 1 | | 6 | | 3 | | | | | | | 9 | 220 | 1400 | 5.2 |
| 17 | 1 | | | 1 | | 7 | | | | | 5 | | | | 12 | 130 | 920 | 7.4 |
| 18 | 1 | | | 1 | | 7 | | | | | 5 | | | | 12 | 190 | 1220 | 5.8 |
| 19 | 1 | | | 1 | | 6 | | | | | | 3 | | | 9 | 130 | 910 | 7.5 |
| 20 | 1 | | | 1 | | 6 | | | | | | 3 | | | 9 | 180 | 1300 | 5.9 |
| 21 | 1 | | | 1 | | 7 | | | | | | | | 5 | 12 | 140 | 900 | 7.7 |
| 22 | 1 | | | 1 | | 7 | | | | | | | | 5 | 12 | 190 | 1310 | 6.1 |
| 23 | 1 | | | 1 | | 6 | | | 4 | | | | | | 10 | 150 | 1100 | 7.2 |
| 24 | 1 | | | 1 | | 6 | | | 4 | | | | | | 10 | 210 | 1250 | 5.1 |
| 25 | 1 | | | 1 | | 8 | | | | 2 | | | | | 10 | 120 | 890 | 7.2 |
| 26 | 1 | | | 1 | | 8 | | | | 2 | | | | | 10 | 280 | 1210 | 5.1 |
| 27 | 1 | | | 1 | | 7 | | | | | 3 | | | | 10 | 120 | 880 | 7.1 |
| 28 | 1 | | | 1 | | 7 | | | | | 3 | | | | 10 | 250 | 1105 | 5.2 |

TABLE 2

| Specimen No. | Primary Ingredient (Molar Part) | | | | | Sub-Ingredient (Molar Part) | | | | | | | | | Total Content | Crystal Particle Size | Dielectric Constant | Specific Resistance log p |
|---|---|---|---|---|---|---|---|---|---|---|---|---|---|---|---|---|---|---|
| | Ba | Ca | Sr | Ti | Zr | Bi | Cu | Zn | Li | Na | K | Ba | Sr | Ca | | | | |
| 29 | 1 | | | 1 | | 0.7 | 0.3 | | | | | | | | 1.0 | 110 | 80 | 6.0 |
| 30 | 1 | | | 1 | | 2 | 1 | | | | | | | | 3.0 | 130 | 910 | 7.3 |
| 31 | 1 | | | 1 | | 3 | 2 | | | | | | | | 5.0 | 150 | 1110 | 7.2 |
| 32 | 1 | | | 1 | | 0.7 | | | | | | 0.3 | | | 1.0 | 100 | 60 | 5.7 |
| 33 | 1 | | | 1 | | 2 | | | | | | 1 | | | 3.0 | 130 | 880 | 7.8 |
| 34 | 1 | | | 1 | | 3 | | | | | | 2 | | | 5.0 | 150 | 1088 | 7.6 |
| 35 | 1 | | | 1 | | 0.7 | | | 0.3 | | | | | | 1.0 | 110 | 60 | 5.8 |
| 36 | 1 | | | 1 | | 2 | | | 1.0 | | | | | | 3.0 | 130 | 820 | 7.2 |
| 37 | 1 | | | 1 | | 3 | | | 2.0 | | | | | | 5.0 | 150 | 1046 | 7.1 |

Specimen numbers 1 to 28 in Table 1 each show effects obtained by changing the type, the content and the crystal particle size of each sub-ingredient.

Specimen numbers 29 to 37 in Table 2 each show effects obtained by changing the type and the content of each sub-ingredient.

was also 100 or higher in the case of a specimen of a dielectric ceramic including a perovskite-type compound containing Ba and Ti (where a part of Ba may be substituted by Ca, and a part of Ti may be substituted by Zr) as a primary ingredient, and further including Q (where Q is at least one of Ba, Ca and Sr) and Bi, in which the crystal particle size of the ceramic is 30 nm or more and 150 nm or less, and the total content of Ba, Ca, Sr, and Bi is equal to or greater than 3 molar parts when the total content of Ti and Zr is 100 molar parts.

INDUSTRIAL APPLICABILITY

The dielectric ceramic of the present invention can be applied to a multilayer ceramic electronic component, and particularly to a multilayer ceramic capacitor, a multilayer ceramic substrate and the like, and contributes to size reduction and increased performance of these components.

REFERENCE SIGNS LIST 1 multilayer ceramic capacitor,
2 multilayer body,
3 ceramic layer,
4, 5 internal electrode,
6, 7 end surface,
8, 9 external electrode,
10, 11 first plating layer,
12, 13 second plating layer.

The invention claimed is:

1. A multilayer ceramic capacitor comprising a multilayer body having a plurality of laminated dielectric ceramic layers and a plurality of internal electrodes at different interfaces between said dielectric ceramic layers; and external electrodes on an outer surface of said multilayer body,
wherein a dielectric ceramic comprising the dielectric ceramic layers comprises a perovskite-type compound containing Ba and Ti as a primary ingredient, and the dielectric ceramic further includes Bi and one of M and Q as sub-ingredients, in which M is at least one member of the group consisting of Cu, Zn, Li, K, and Na, and Q is at least one member of the group consisting of Ba, Ca and Sr,
a total content of M, Q and Bi is equal to or greater than 3 molar parts when a total content of Ti is 100 molar parts, and
a crystal particle size of said dielectric ceramic is 30 nm or more and 150 nm or less.

2. The multilayer ceramic capacitor according to claim 1, wherein the total content of M, Q, and Bi is equal to or less than 12 molar parts when the total content of Ti is 100 molar parts.

3. A multilayer ceramic capacitor according to claim 2, wherein the dielectric ceramic includes the Bi and the M as the sub-ingredients.

4. A multilayer ceramic capacitor according to claim 2, wherein the dielectric ceramic includes the Bi and the Q as the sub-ingredients.

5. A multilayer ceramic capacitor according to claim 4, wherein a part of the Ba is substituted by Ca, and a part of the Ti is substituted by Zr.

6. A multilayer ceramic capacitor according to claim 1, wherein the dielectric ceramic includes the Bi and the M as the sub-ingredients.

7. A multilayer ceramic capacitor according to claim 1, wherein the dielectric ceramic includes the Bi and the Q as the sub-ingredients.

8. A multilayer ceramic capacitor according to claim 7, wherein a part of the Ba is substituted by Ca, and a part of the Ti is substituted by Zr.

9. A multilayer ceramic capacitor according to claim 2, wherein said total content of M, Q and Bi is at a time when said dielectric is dissolved in a solvent.

10. A multilayer ceramic capacitor according to claim 1, wherein said total content of M, Q and Bi is at a time when said dielectric is dissolved in a solvent.

11. A dielectric ceramic comprising a perovskite-type compound containing Ba and Ti as a primary ingredient, and the dielectric ceramic further comprising Bi and one of M and Q as sub-ingredients, wherein M is at least one member of the group consisting of Cu, Zn, Li, K, and Na, and Q is at least one member of the group consisting of Ba, Ca and Sr, a total content of M, Q and Bi is equal to or greater than 3 molar parts when a total content of Ti is 100 molar parts, and a crystal particle size of said dielectric ceramic is 30 nm or more and 150 nm or less.

12. The dielectric ceramic according to claim 11, wherein the total content of M, Q and Bi is equal to or less than 12 molar parts when the total content of Ti is 100 molar parts.

13. The dielectric ceramic according to claim 12, wherein the dielectric ceramic includes the Bi and the M as the sub-ingredients.

14. The dielectric ceramic according to claim 12, wherein the dielectric ceramic includes the Bi and the Q as the sub-ingredients.

15. The dielectric ceramic according to claim 14, wherein a part of the Ba is substituted by Ca, and a part of the Ti is substituted by Zr.

16. The dielectric ceramic according to claim 11, wherein the dielectric ceramic includes the Bi and the M as the sub-ingredients.

17. The dielectric ceramic according to claim 11, wherein the dielectric ceramic includes the Bi and the Q as the sub-ingredients.

18. The dielectric ceramic according to claim 17, wherein a part of the Ba is substituted by Ca, and a part of the Ti is substituted by Zr.

19. A method of forming a multilayer ceramic capacitor comprising forming a ceramic green sheet from a slurry of a dielectric ceramic according to claim 11, forming a laminate comprising a plurality of the ceramic green sheets with a pair of internal electrodes disposed at different interfaces between adjacent ceramic green sheets, and sintering the laminate.

20. A method of forming a multilayer ceramic capacitor comprising forming a ceramic green sheet from a slurry of a dielectric ceramic according to claim 12, forming a laminate comprising a plurality of the ceramic green sheets with a pair of internal electrodes disposed at different interfaces between adjacent ceramic green sheets, and sintering the laminate.

* * * * *